S. MYERS.
FRUIT-DRIER.
No. 189,952. Patented April 24, 1877.
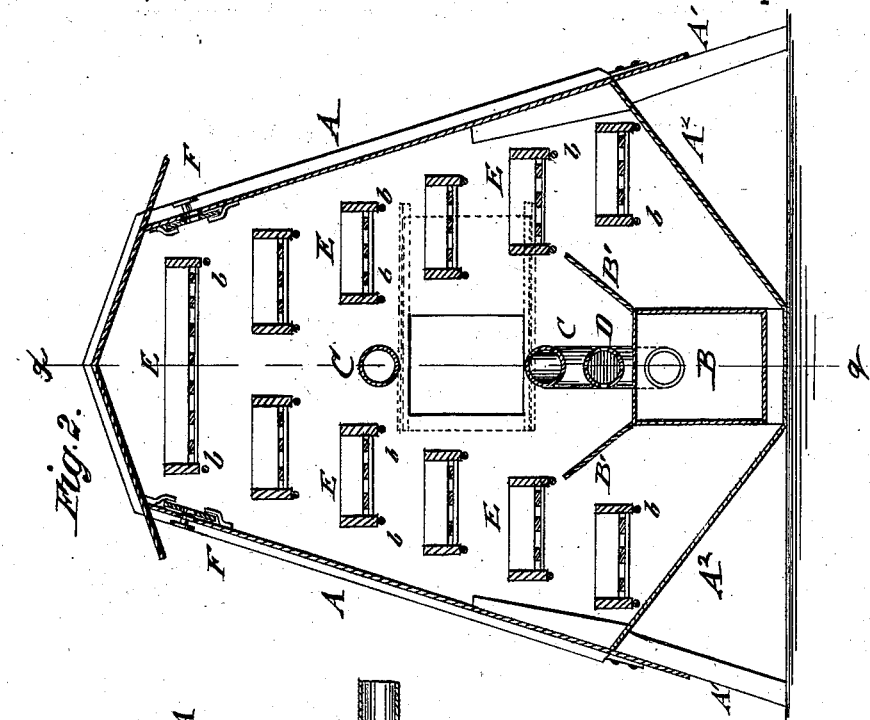
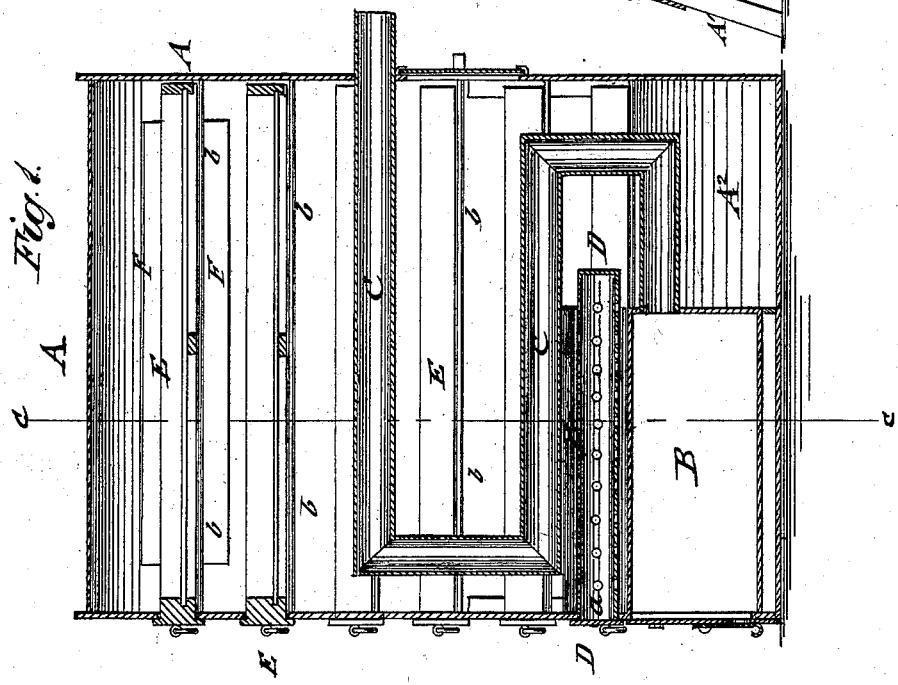
WITNESSES:
INVENTOR:
BY
ATTORNEYS.

UNITED STATES PATENT OFFICE.

SAMUEL MYERS, OF ADAMSBOROUGH, INDIANA.

IMPROVEMENT IN FRUIT-DRIERS.

Specification forming part of Letters Patent No. 189,952, dated April 24, 1877; application filed February 17, 1877.

*To all whom it may concern:*

Be it known that I, SAMUEL MYERS, of Adamsborough, in the county of Cass and State of Indiana, have invented a new and Improved Fruit-Drier, of which the following is a specification:

In the accompanying drawing, Figure 1 represents a vertical longitudinal section of my improved fruit-drier on line $g\,g$, Fig. 2, and Fig. 2 is a vertical transverse section of the same on line $c\,c$, Fig. 1.

Similar letters of reference indicate corresponding parts.

The invention consists in the novel means employed by me to pass a current of dry heated air over fruit until it is completely dried, without allowing the air to stand, or that which has been moistened by contact with fruit on lower shelves to come afterward in contact with that on the upper shelves.

In the drawing, A represents the outer sheet-metal casing of my improved fruit-drier, which is supported on legs $A^1$, and made, preferably, so as to taper toward the top. The lower part of the outer casing A is closed by an inclined sheet-iron bottom, $A^2$, and provided with a central heater, B, that is made of heavy sheet-iron or metal, and so attached as to be renewed when burned out. A space is formed at both sides of the heater and back of the same to prevent damage by overheating, the smoke C being carried backward and forward through the drier, and finally back to the chimney, so as to utilize the heat of the escaping gases and smoke as much as possible. Above the heater B is placed a perforated air-tube, D, that is closed at the rear end and open at the front end, drawing in the air at the front end through a register, $a$ and heating the same in the passage through the tube. The air is distributed in the drier, and establishes a rapid current over and through the drawers or shelves E, on which the fruit is placed for drying. The drawers E are arranged at both sides of the air and smoke pipes, as shown in Fig. 2, and are readily drawn out and interchanged, as required by the state of the fruit. The drawers are supported on wire rods $b$, and provided with a slat or perforated bottom to give free access of heat to all parts of the fruit. At both sides of the heater B are inclined wings or plates $B'$ that extend to the right and left, and deflect the heat from the sides of the heater to the lower drawers. Between the drawers E and side walls of casing A are spaces or channels of suitable width, along which the evaporated moisture from the fruit is carried up to the ventilator F below the top part or cover of the drier. The ventilator F may be regulated by slide-pieces, so as to carry off any surplus heat formed, and prevent any injurious influence of the heat on the fruit to be dried.

The drawers have a large drying-surface, and occasion no loss of heat on being drawn out or put in, as when opening a large door. The changing of the drawers produces therefore no detention of the drying process, while it furnishes a more conveniently handled and more satisfactorily-working drier for all kinds of fruit.

Having thus described my invention, I claim as new and desire to secure by Letters Patent—

A fruit-drier consisting of the case $A\,A^2$, central heater B, having deflectors $B'$, the rear-closed perforated tube D, having register $a$, and the drawers E, arranged at some distance from the sides of the case, and relatively supported on rods $b$, as shown and described.

SAMUEL MYERS.

Witnesses:
 DE WITT C. JUSTICE,
 WILL. B. HOOVER.